United States Patent [19]
Tavor et al.

[11] Patent Number: 6,070,154
[45] Date of Patent: May 30, 2000

[54] INTERNET CREDIT CARD SECURITY

[75] Inventors: Onn Tavor, Ramat Hasharon; Gila Ben Avraham; Vadim Shevchenko, both of Netania, all of Israel

[73] Assignee: Activepoint Ltd., Netania, Israel

[21] Appl. No.: 09/200,719

[22] Filed: Nov. 27, 1998

[51] Int. Cl.[7] .............................. G06F 17/60; G06F 7/00; G06F 15/30

[52] U.S. Cl. ................................. 705/55; 765/1; 765/39; 765/44; 380/54

[58] Field of Search ................................. 705/55, 1, 39, 705/44; 380/54

[56] References Cited

U.S. PATENT DOCUMENTS

| | | | |
|---|---|---|---|
| 5,995,626 | 1/2000 | Nishioka | 380/25 |
| 5,996,076 | 11/1999 | Rowney et al. | 713/201 |
| 5,999,596 | 12/1999 | Walker et al. | 379/91.01 |
| 6,000,832 | 12/1999 | Franklin et al. | 364/479.02 |
| 6,006,328 | 12/1999 | Drake | 713/200 |
| 6,012,144 | 1/2000 | Pickett | 713/201 |
| 6,014,634 | 1/2000 | Scroggie et al. | 705/14 |
| 6,014,635 | 1/2000 | Harris et al. | 705/14 |
| 6,014,650 | 1/2000 | Zampese | 705/44 |

*Primary Examiner*—Allen R. MacDonald
*Assistant Examiner*—Pedro R. Kanof
*Attorney, Agent, or Firm*—Mark M. Friedman

[57] ABSTRACT

A method for transmitting credit card numbers in a secure manner through an electronic medium such as the Internet. Credit card numbers typically consist of a string of 10–20 digits, with the exact number of digits depending upon the provider of the credit card. The security is provided by transmitting the credit card number in a plurality of different transmissions, each transmission containing at least one digit of the credit card number, but fewer than all of the digits of the credit card number. Preferably, the user selects the number of digits from the credit card number to send with each transmission. Thus, the entire credit card number can only be determined by receiving all of the transmissions from the user, thereby significantly increasing the difficulty of intercepting the credit card number.

14 Claims, 5 Drawing Sheets

Credit Card Charge

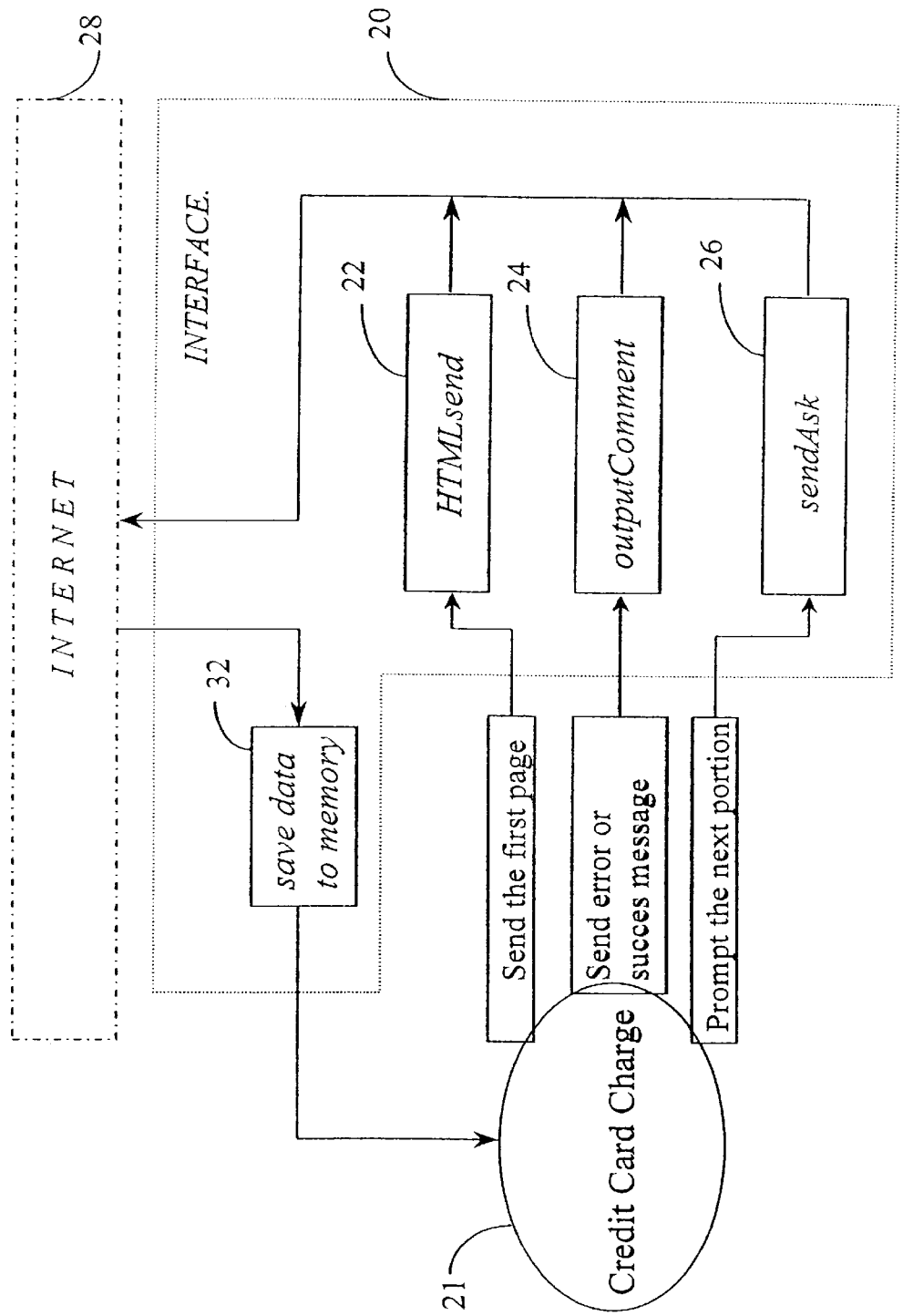
FIG 3. "Credit Card Charge" - Interface connection

6,070,154

INTERNET CREDIT CARD SECURITY

FIELD AND BACKGROUND OF THE INVENTION

The present invention relates to credit card security on the Internet, and in particular, to a method for providing secure transmission of credit card numbers through the Internet.

As the Internet grows, many Web sites are becoming connected and more corporations are trying to do business on the "Web". Although most information is still given freely on the Internet, an increasing number of organizations are attempting to actually sell their products electronically by charging a credit card. The area of electronic sales, or Electronic Commerce (e-commerce), has been developing rapidly. The new and exciting point about e-commerce is the ability of everyone, almost anywhere on the globe to which a Web connection is available, to access any commercial business offerings catalog implemented as a Web site. Moreover, the user can access this service anytime, 24 hours a day, seven days a week and pay for these purchases with a credit card. However, many problems with credit card security remain.

The lack of security for transmission of credit card numbers through the Internet is a hindrance to the further development of electronic commerce. The transmission of credit card numbers must be perceived as secure, as well as being secure in actuality. Without such security, many consumers will be hesitant to send their credit card numbers through the Internet, thereby potentially reducing sales through electronic commerce.

There is thus a need for, and it would be useful to have, a method for secure transmission of credit card numbers through the Internet or via some other electronic connection.

SUMMARY OF THE INVENTION

The present invention is of a method for transmitting credit card numbers in a secure manner through an electronic medium such as the Internet. Credit card numbers typically consist of a string of 10–20 digits, with the exact number of digits depending upon the provider of the credit card. The security is provided by transmitting the credit card number in a plurality of different transmissions, each transmission containing at least one digit of the credit card number, but fewer than all of the digits of the credit card number. Preferably, the user selects the number of digits from the credit card number to send with each transmission. Thus, the entire credit card number can only be determined by receiving all of the transmissions from the user, thereby significantly increasing the difficulty of intercepting the credit card number.

According to the present invention, there is provided a method for securely transmitting a credit card number of a user from a credit card charge GUI (graphical user interface) to a vendor through an electronic medium, the credit card number comprising a plurality of digits, the method comprising the steps of: (a) entering at least one digit of the credit card number to the credit card charge GUI by the user to form at least one entered digit; (b) sending the at least one entered digit of the credit card number to the vendor through the electronic medium from the credit card charge GUI to form at least one sent digit; (c) receiving the at least one sent digit of the credit card number by the vendor; (d) repeating steps (a) to (c) until substantially all digits of the credit card number have been received by the vendor to form a plurality of received digits, such that steps (a) to (c) are performed at least twice; and (e) ordering the plurality of received digits to form the credit card number.

Preferably, the credit card charge GUI is a Web browser and the electronic medium is an Internet.

Preferably, the method further comprises the steps of: (i) entering a type of credit card into the credit card charge GUI by the user; and (ii) determining a number of digits for being entered by the user at step (a) according to the type of credit card; wherein steps (i) and (ii) are performed substantially before step (a) is performed. More preferably, step (i) further comprises the step of: (1) selecting an option for determining the number of digits for being entered by the user. Most preferably, the option is one of a fixed number of options for determining the number of digits for being entered by the user. Alternatively and most preferably, step (ii) is performed by the user when the user performs step (a), such that the user separately determines the number of digits for being entered at step (a).

Preferably, step (a) further comprises the step of: (i) examining the at least one digit by the credit card charge GUI, such that if the at least one digit is not a numerical character, the credit card charge GUI rejects the at least one digit. More preferably, step (a) further comprises the step of: (ii) rejecting substantially all entered digits by the credit card charge GUI if the credit card charge GUI rejects the at least one digit.

Preferably, the method further comprises the step of: (f) notifying the user after substantially all digits of the credit card number have been received.

Also preferably, the method further comprises the step of: (f) encrypting the credit card number according to a key to form an encrypted credit card number. More preferably, step (f) further comprises the steps of: (i) dividing the credit card number into a plurality of credit card number portions; (ii) dividing the key into a plurality of key portions; (iii) performing a mathematical operation with each of the plurality of credit card number portions and each of the plurality of key portions to encode each of the plurality of credit card number portions; and (iv) repeating step (iii) until substantially all of the plurality of credit card number portions have been encoded. Most preferably, step (iii) further comprises the steps of: (1) setting a flag for each of the plurality of credit card number portions, the flag including a value selected from the group consisting of overflow, no overflow and underflow, the value being determined as overflow if an overflow occurred during the mathematical operation, the value being determined as underflow if an underflow occurred during the mathematical operation and the value being determined as no overflow if the underflow and the overflow did not occur during the mathematical operation; (2) if the overflow occurred, adding a plurality of extra digits to another part of the flag; and (3) if the underflow occurred, adding a plurality of removed digits to another part of the flag.

Preferably, the method further comprises the step of: (g) decrypting the encrypted credit card number according to the key.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Universal Resource Locator). Hereinafter, the term "Web site" refers to at least one Web page, and preferably a plurality of Web pages, virtually connected to form a coherent group.

Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "user" is the person who operates the Web browser or other GUI interface and navigates through the system of the present invention.

Hereinafter the word "product" includes both physical products and services (tangible and intangible products), as well as ideas and concepts.

The present invention can be realized as software, for example as a plurality of instructions being performed by a computing platform; as hardware, for example as a circuit; as firmware, or as a combination thereof. In any case, the present invention can be described as a method being operated by a data processor, regardless of whether the present invention is implemented as software, hardware or firmware, or a combination thereof.

BRIEF DESCRIPTION OF THE DRAWINGS

The foregoing and other objects, aspects and advantages will be better understood from the following detailed description of a preferred embodiment of the invention with reference to the drawings, wherein:

FIG. 3 is a schematic block diagram of an illustrative credit charge interface of the present invention.

DETAILED DESCRIPTION OF THE INVENTION

The present invention is of a method for transmitting credit card numbers in a secure manner through an electronic medium such as the Internet. Credit card numbers typically consist of a string of 10–20 digits, with the exact number of digits depending upon the provider of the credit card. The security is provided by transmitting the credit card number in a plurality of different transmissions, each transmission containing at least one digit of the credit card number, but fewer than all of the digits of the credit card number. Preferably, the user selects the number of digits from the credit card number to send with each transmission. Thus, the entire credit card number can only be determined by receiving all of the transmissions from the user, thereby significantly increasing the difficulty of intercepting the credit card number.

The principles and operation of a method for providing a secure method for transmission of credit card numbers according to the present invention may be better understood with reference to the drawings and the accompanying description, it being understood that these drawings are given for illustrative purposes only and are not meant to be limiting.

Figure 1:
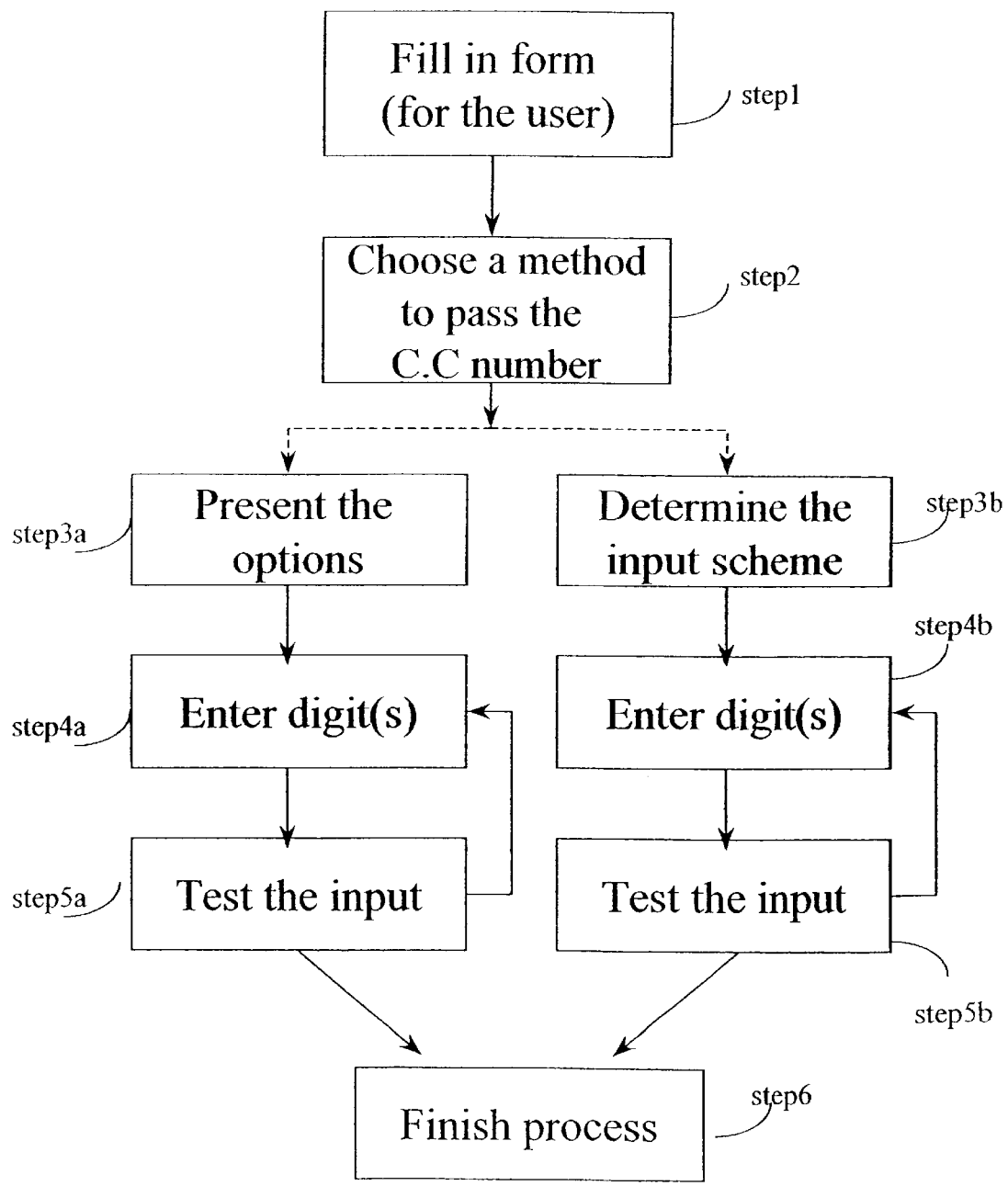
FIG. 1 is a schematic block diagram of an illustrative method for entering credit card numbers by the user according to the present invention.

Referring now to the drawings, FIG. 1 is a block diagram of an exemplary method for secure transmission of a credit card number according to the present invention. In the method of the present invention, the user interacts with a credit card charge GUI (graphical user interface) which is preferably provided through a Web browser. The user enters information through the credit card charge GUI, such as the credit card number, and this information is then sent to the vendor from whom the user wishes to purchase a product. The information is sent through an electronic medium, such as the Internet, in a secure manner as described in greater detail below.

In step 1, the user is prompted to fill in a form consisting of personal data (name, last name, address, and so forth) and the type of the credit card provided by the financial institution, such as Visa™, Diners™ or MasterCard™, which is essential to determine how many digits should be received by the vendor. For example, the Visa™ card has 16 digits while the Diners™ card has 12 digits and so forth.

In step 2, the user chooses whether to enter the credit card number according to a "fixed" method or to a "flexible" method.

If the user selects the "fixed" method, in step 3a, a plurality of predetermined options is presented to the user, from which the user selects one option for entering the credit card number. Each such option presents a different scheme for dividing the digits of the credit card number into a plurality of portions for transmission, with each portion being sent separately. Each portion contains at least one digit, but fewer than all of the digits of the credit card number.

In step 4a, the user is presented with a form and is prompted to enter the number of digits of the credit card number according to the selected option. For example, if the credit card number had 16 digits, and the user had chosen to send the credit card number with two transmissions, then each form for entering digits of the credit card number would contain 8 digits and the user would be prompted to enter 8 digits for each of two forms.

The credit card number can be divided according to many different schemes, depending upon the number of digits of the credit card number.

For example, if the credit card number includes 16 digits, the options for dividing the credit card number could be as follows: transferring the credit card number by 1 digit at a time with 16 forms; transferring the credit card number by 2 digits at a time with 8 forms; transferring the credit card number by 4 digits at a time with 4 forms and transferring the credit card number by 8 digits at a time with 2 forms.

On the other hand, if the credit card includes 12 digits, the options could include: transferring the credit card number by 1 digit at a time with 12 forms; transferring the credit card number by 2 digits at a time with 6 forms; transferring the credit card number by 3 digits at a time with 4 forms; transferring the credit card number by 4 digits at a time with 3 forms and transferring the credit card number by 6 digits at a time with 2 forms.

In step 5a, after the user has input a portion of the credit card number, according to the number of digits selected previously, the form is examined and the digits of the credit card number are stored. Step 4a is then repeated and another form is generated. Steps 4a and 5a are repeated until the entire credit card number is received. The number of digits still required for input is displayed for the convenience of the user.

If any errors occur during steps 4a and 5a, for example if characters other than digits are entered, or if extra numbers are entered, the process is interrupted and is restarted from the beginning.

In step 6, after all digits have been received, the user is notified that the process has finished successfully.

If, however, the user selects the "flexible" option, in step 3b the user may create any scheme for dividing the digits of the credit card number. For example, if the credit card has 12 numbers, the user could divide the digits into different transmissions as follows: 5 digits, 1 digit, 1 digit, 3 digits, and 2 digits. If the credit card has 16 numbers, the user could divide the digits into different transmissions as follows: 1 digit, 1 digit, 6 digits, 1 digit, 2 digits, and 1 digit. Of course, other combinations are also possible.

In step 4b, the user is presented with a form and is prompted to enter the number of digits of the credit card number according to the scheme created.

In step 5b, after the user has input a portion of the credit card number, according to the number of digits selected previously, the form is examined and the digits of the credit card number are stored. Step 4b is then repeated and another form is generated. Steps 4b and 5b are repeated until the entire credit card number is received. The number of digits still required for input is displayed for the convenience of the user.

As for the fixed option, if any errors occur during steps 4a and 5a, for example if characters other than digits are entered, or if extra numbers are entered, the process is interrupted and is restarted from the beginning.

Once the credit card number has been successfully entered, the user is notified in step 6.

Figure 2:
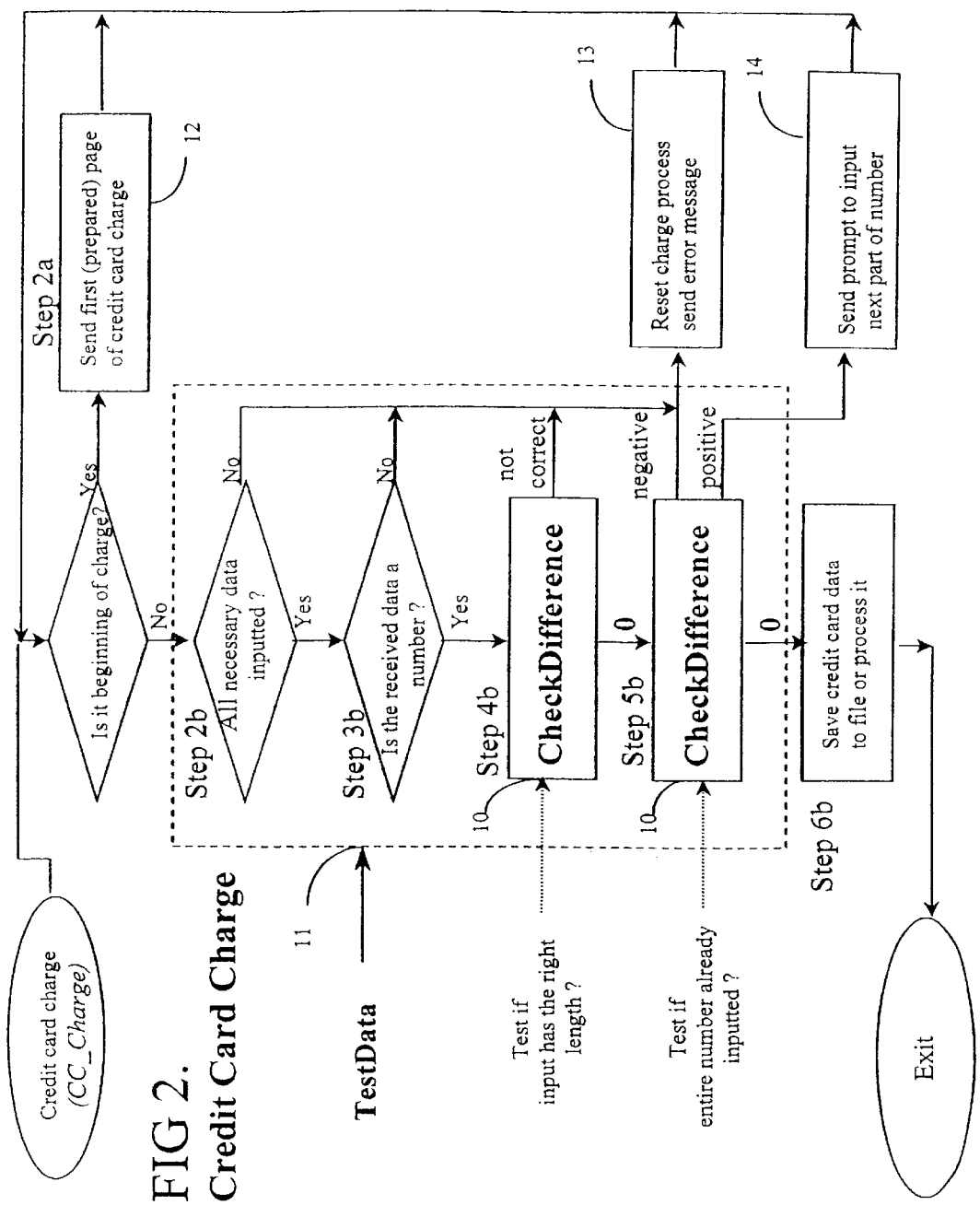
FIG. 2 is a schematic block diagram of an illustrative credit charge method according to the present invention.

FIG. 2 is a flowchart of an exemplary method for performing the secure transmission of credit card numbers according to the present invention. It should be noted that the same "CC_Charge" function is called several times during the process of secure transmission. However the behavior of the function depends upon the state of the process. In order to indicate the state, appropriate flags are used.

In step 1, the presence of the flag named "beginning_of_charge" is being tested. This testing is done in order to determine whether to send the first predetermined HTML page at the beginning of the process, as shown in step 2a. Preferably, the difference between the first HTML page and the following pages is that the first page is permanently stored, while the other pages are created dynamically (see FIG. 3 below).

The first page contains the first form, which optionally and preferably includes fields for name, address, telephone number of user and credit card type.

If the process is not at the beginning, such that the first HTML page with the first form has been displayed to the user, then the process goes to the "TestData" routine for steps 2b–5b. The "TestData" routine (block 11) tests the received data and indicates whether all necessary user data has been entered and successfully received by the server. For example, after the first form has been filled out and returned by the user, the "TestData" routine determines whether all mandatory fields have data of the proper type. Certain fields in the first page are mandatory, such as the name of the user and the type of credit card. Other fields are less important to the process of charging, such as a second telephone number or an E-mail address, and therefore do not need to be filled in by the user. If not all of the necessary data was entered, as shown in step 2b, an error message is sent and the process restarts, as shown at block 13.

For subsequent pages, the user must fill in the correct portion of the credit card number, according to the option selected as described in FIG. 1. In step 3b, the TestData routine determines whether the received data is a number, for those subsequent forms in which digits from the credit card number itself are being entered by the user.

In step 4b, the "CheckDifference" subroutine (block 10) determines whether the current portion of the credit card number is of the correct number of digits, as chosen by the user at the beginning of the process. If the user chose the flexible mode, the test is skipped, since the number of digits is arbitrarily chosen by the user for each portion. If the current portion does not have the correct number of digits, the process continues at block 13, such that an error message is sent and the process restarts.

Otherwise, if the current portion did have the correct number of digits, the digits of the current portion are appended to the previously received portions of the credit card number, for example by using string concatenation, in order to construct the entire credit card number . The "f_charge" variable serves the credit card number collection by holding the added up strings.

In step 5b, the "CheckDifference" subroutine determines whether the entire credit card number has been received, by comparing the number of digits of the received number with the number of digits expected for the type of the credit card. For example, if the user entered the type of credit card as a Visa™ card, the number of digits should be equal to 12 digits. For a MasterCard™ card, the number of digits is 16 digits, and so on.

In order to determine whether the entire credit card number has been received, the "CheckDifference" subroutine performs a subtraction between the number of expected digits, which is a constant, and the number of digits which have been received. The variable "left" is used to store the difference between these numbers. If the entire credit card number has not been received, the CheckDifference subroutine returns the difference between the two numbers. If the difference is positive, the TestData routine then prompts the user to input next the portion of the credit card number (block 14). The user is then informed of the number of digits which must still be entered, using the positive value which was returned from the CheckDifference subroutine.

If CheckDifference returned a negative difference, extra numbers were input. In that case, an error message is sent and the process restarts.

After the number has been received, the credit card number is optionally encoded and stored together with user's personal information for further processing. Thus, if encoding is used, the entire credit card number exists as a whole for only a short period of time between the reception of the number and the process of encoding the number.

FIG. 3 shows a schematic block diagram of an exemplary credit charge interface according to the present invention. An interface module 20 controls the communication between the user and credit card charge process 21 (see FIG. 1), by receiving instructions from credit charge process 21 and by sending data to credit charge process 21.

Interface module 20 reads the first HTML page with the first form and sends this page to the user with an HTMLsend module 22. Subsequent HTML pages containing subsequent forms are built "on the fly" by Interface module 20. A sendAsk module 26 prompts the user to input digits of the credit card number and an outputComment module 24 reports errors and/or successful completion of the process.

The data which is received from Internet 28, or from any other type of electronic medium, is stored in internal memory 32. From memory 32, the data is made available for all relevant routines of credit card charge process 21. Credit card charge process 21 uses the functions of interface module 20 to send prepared HTML forms, such as the form for general user data, through HTMLsend module 22. HTMLsend module 22 reads a prepared HTML page from the storage medium, such as a hard disk, and sends the prepared HTML page to Internet 28, which is the standard output if standard CGI Web server technology is being used.

SendAsk module 26 builds HTML pages with forms for receiving portions of the credit card number. SendAsk module 26 sends an HTML header, a prompt for the user to input the next portion of the credit card number, and an input field for receiving the portion of the credit card number. The prompt includes the number of digits remained for the user to input. The form is sent when the user presses the "Continue" button.

OutputComment module 24 builds HTML pages for displaying error messages and notifications. The pages consist of an HTML page header and the message text and are sent by the "Continue" button as well.

It should be noted that all of the described procedures are equally applicable for ISAPI (Internet Server Application Programming Interface) as well as other types of Web server technologies.

Figure 4A:
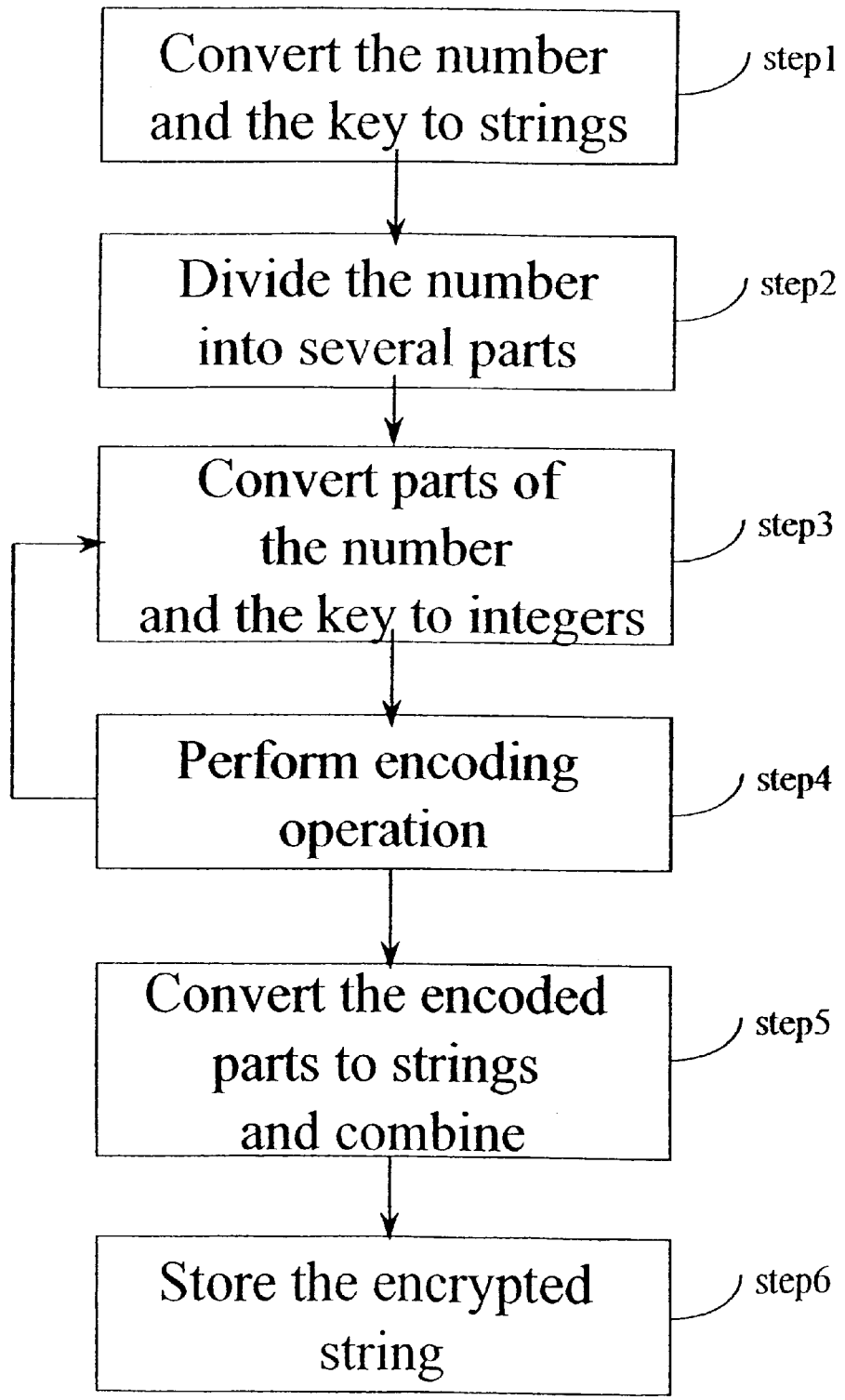
FIGS. 4A and 4B are methods for encoding and decoding the credit card number of the present invention.
Figure 4B:
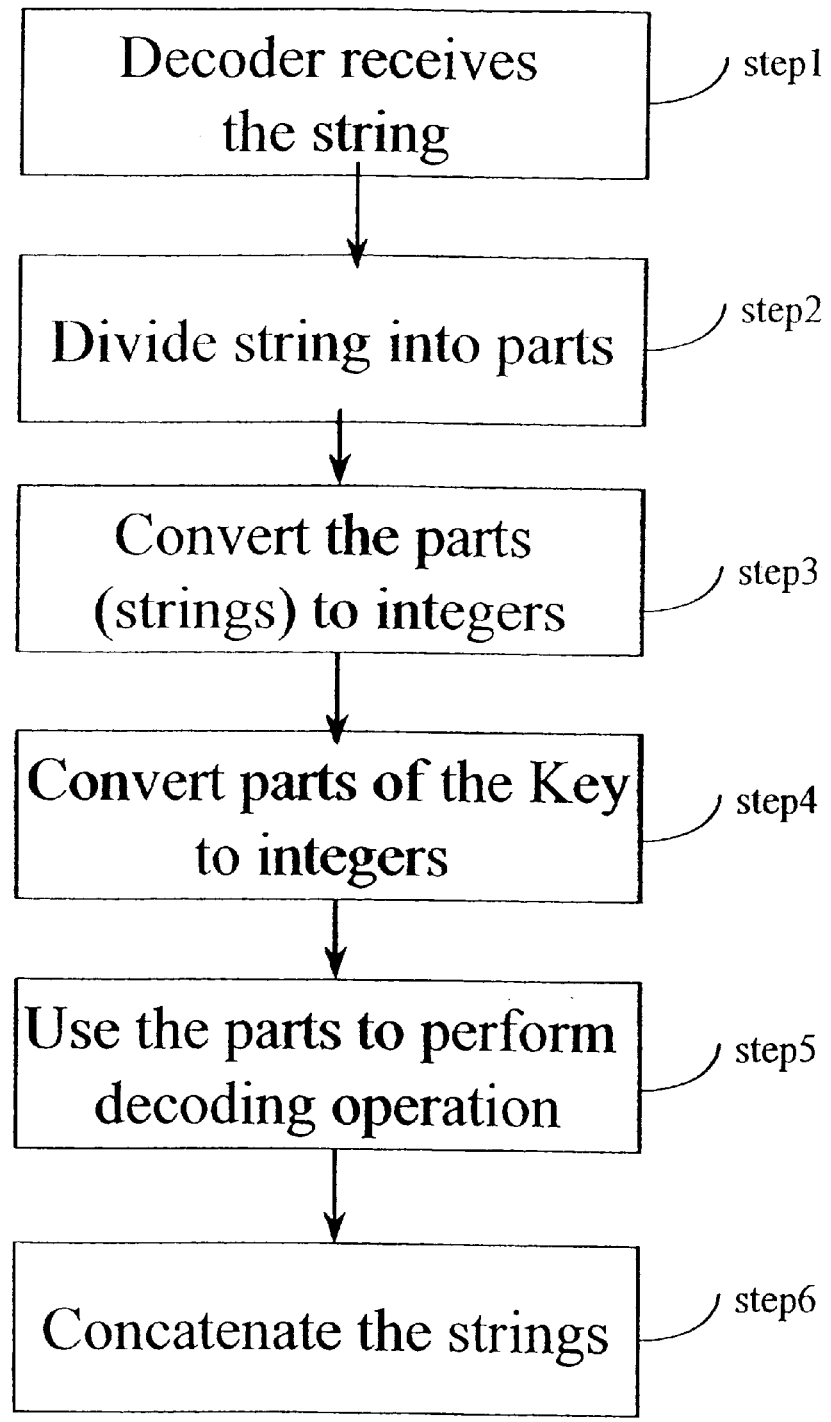

FIGS. 4A and 4B show flowcharts of exemplary methods for encoding and decoding the credit card number according to the present invention. This method is intended as an example only, without intending to be limiting in any way, of a method for encrypting and decrypting the credit card number. Encrypting the credit card number is preferred in order to preferably avoid storing the open, unencrypted number on an Internet server computer or on any other computer which does not belong to the credit card company, for example in order to prevent the number from being stolen from a computer of the vendor.

The steps of the method are as follows. As shown in FIG. 4A, the received credit card number is encoded by the following steps. First, the credit card number is divided into several parts.

Next, each part is encrypted by using a mathematical operation selected from the group consisting of an arithmetic operation or a logic operation performed according to the appropriate section of a key, to form an encrypted credit card number part. During the process of encryption, the length of the resultant string may overflow or underflow the length of the part which was encrypted. "Situation flags" are then given to recognize these problems, such that the 'overflow', 'underflow' or 'no overflow' flag is set for every part which is encrypted.

The process of encryption is as follows. In step 1, the credit card number, as well as the key, are converted to a string. The "encrypt" routine is then invoked, for steps 2–6.

In step 2, the credit card number is divided into several parts.

In step 3, the characters of the first portion of the number are converted to an integer. The same operation is performed with the first part of the key. The key is a number which is represented as a string and passed as an argument to the "encrypt" routine. The key is the entity used to perform mathematical/logical operation on, with the credit card number in order to encrypt the number.

In step 4, an arithmetic or logic operation with these integers is performed. If overflow or underflow occurs then the appropriate 'overflow' or 'underflow' flag is set.

The structure of the flags consists of three parts. The first part holds, as previously described, the "overflow", "no overflow" or "underflow" information about the portion of the number to which it corresponds. The second part of the flag carries information about the number of digits which the corresponding portion of the number contains. If overflow or underflow did occur, the third part of the flag holds the extra, or missing, number of digits which were added, or subtracted, as a direct result of the encoding operation. This number is evaluated by subtracting the length of the string before encryption from the length of the string after encryption. The initial values of the flags are set to "no overflow" for the first part and "0" for the other two parts.

Steps 3 and 4 are then repeated for the next portion of the number and of the key, such that the same operations are performed with every portion of the number and the corresponding part of the key.

After all of the encrypted parts of the number have been converted to strings, in step 5, these strings are preferably combined into a single encoded string with their corresponding flags. In step 6, the resultant string is stored in an external file along with the rest of the client's personal data, such as first name, last name, and so forth, until the credit card number is required.

Once the credit card number is required, the encoded string must be decoded as shown in FIG. 4B. The decoder program is preferably a separate program, isolated from the encoder program in order to prevent fraud and unauthorized access. More preferably, the decoder program is located in a different server, company, network or the like.

One implementation is to optionally locate the decoder program at the credit card company, so the card number is not available even to the vendor selling the goods. According to this optional but preferred implementation, the vendor receives the number only as a code representation, and the card number itself is stored at the credit card company or financial institution which is providing the credit card to the user.

As shown in FIG. 4B, in step 1, the decoder program receives the string which represents the encoded credit card number and the associated key. In step 2, the decoder program divides the string into the parts according to the flags. Preferably, the flags are removed from the string by extracting the sub-string of the flags from the string. More preferably, the decoder program divides the string into parts according to the value of the second part of the flag, by collecting the appropriate number of digits from the number and the key.

In step 3, the decoder program converts the parts into integers. In step 4, the decoder program converts the associated parts of the key into integers. In step 5, the decoder program uses each part of the key to perform the opposite arithmetic or logic operation on the associated part.

After repeating step 5 to perform the operation with all parts of the string in order to form decoded parts of the string, the decoder program concatenates these decoded parts of the string to create the decoded number in step 6.

It should be noted that the method of the present invention is not limited to the implementations described above. For example, the method of the present invention is optionally and preferably implemented with the SSL (secure socket layer) security protocol, in order to provide additional security for the transmission of the credit card number. The method of the present invention is able to increase the security of the encryption protocol of SSL by sending portions of the credit card number in different transmissions. Of course, the method of the present invention could be implemented with other types of security methods or protocols. Thus, the method of the present invention can be a valuable adjunct to increase the security of other methods or protocols for secure transmission of credit card number.

It will be appreciated that the above descriptions are intended only to serve as examples, and that many other embodiments are possible within the spirit and the scope of the present invention.

What is claimed:

1. A method for securely transmitting a credit card number of a user from a credit card charge GUI (graphical user interface) to a vendor through an electronic medium, the credit card number comprising a plurality of digits, the steps of the method being performed by a data processor, the method comprising the steps of:
   (a) entering at least one digit of the credit card number to the credit card charge GUI by the user to form at least one entered digit;
   (b) sending said at least one entered digit of the credit card number to the vendor through the electronic medium from the credit card charge GUI to form at least one sent digit;
   (c) receiving said at least one sent digit of the credit card number by the vendor;
   (d) repeating steps (a) to (c) until substantially all digits of the credit card number have been received by the vendor to form a plurality of received digits, such that steps (a) to (c) are performed at least twice; and
   (e) ordering the plurality of received digits to form the credit card number.

2. The method of claim 1, wherein the credit card charge GUI is a Web browser and the electronic medium is an Internet.

3. The method of claim 1, further comprising the steps of:
   (i) entering a type of credit card into the credit card charge GUI by the user; and
   (ii) determining a number of digits for being entered by the user at step (a) according to said type of credit card;
   wherein steps (i) and (ii) are performed substantially before step (a) is performed.

4. The method of claim 3, wherein step (i) further comprises the step of:
   (1) selecting an option for determining said number of digits for being entered by the user.

5. The method of claim 4, wherein said option is one of a fixed number of options for determining said number of digits for being entered by the user.

6. The method of claim 3, wherein step (ii) is performed by the user when the user performs step (a), such that the user separately determines said number of digits for being entered at step (a).

7. The method of claim 1, wherein step (a) further comprises the step of:
   (i) examining said at least one digit by said credit card charge GUI, such that if said at least one digit is not a numerical character, said credit card charge GUI rejects said at least one digit.

8. The method of claim 7, wherein step (a) further comprises the step of:
   (ii) rejecting substantially all entered digits by said credit card charge GUI if said credit card charge GUI rejects said at least one digit.

9. The method of claim 1, further comprising the step of:
   (f) notifying the user after substantially all digits of the credit card number have been received.

10. The method of claim 1, further comprising the step of:
    (f) encrypting the credit card number according to a key to form an encrypted credit card number.

11. The method of claim 10, wherein step (f) further comprises the steps of:
    (i) dividing the credit card number into a plurality of credit card number portions;
    (ii) dividing said key into a plurality of key portions;
    (iii) performing a mathematical operation with each of said plurality of credit card number portions and each of said plurality of key portions to encode each of said plurality of credit card number portions; and
    (iv) repeating step (iii) until substantially all of said plurality of credit card number portions have been encoded.

12. The method of claim 11, wherein step (iii) further comprises the steps of:
    (1) setting a flag for each of said plurality of credit card number portions, said flag including a value selected from the group consisting of overflow, no overflow and underflow, said value being determined as overflow if an overflow occurred during said mathematical operation, said value being determined as underflow if an overflow occurred during said mathematical operation and said value being determined as no overflow if said underflow and said overflow did not occur during said mathematical operation;
    (2) if said overflow occurred, adding a plurality of extra digits to another part of said flag; and
    (3) if said underflow occurred, adding a plurality of removed digits to another part of said flag.

13. The method of claim 12, further comprising the step of:
    (v) combining said encoded portions of the credit card number into a single string.

14. The method of claim 13, further comprising the step of:
    (g) decrypted said encrypted credit card number according to said key.

* * * * *